April 16, 1968   J. R. B. WHITTLESEY   3,378,446
APPARATUS USING LASERS TO TRIGGER THERMONUCLEAR REACTIONS
Filed March 9, 1964
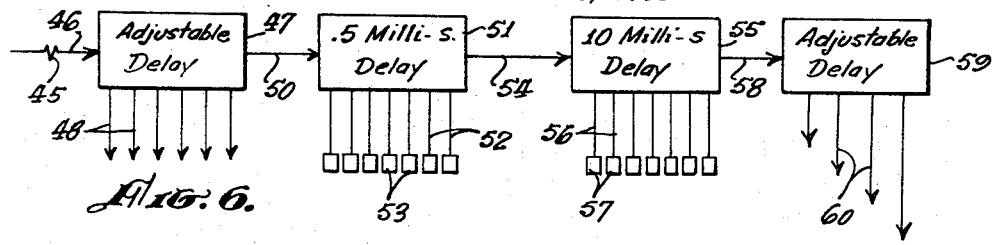
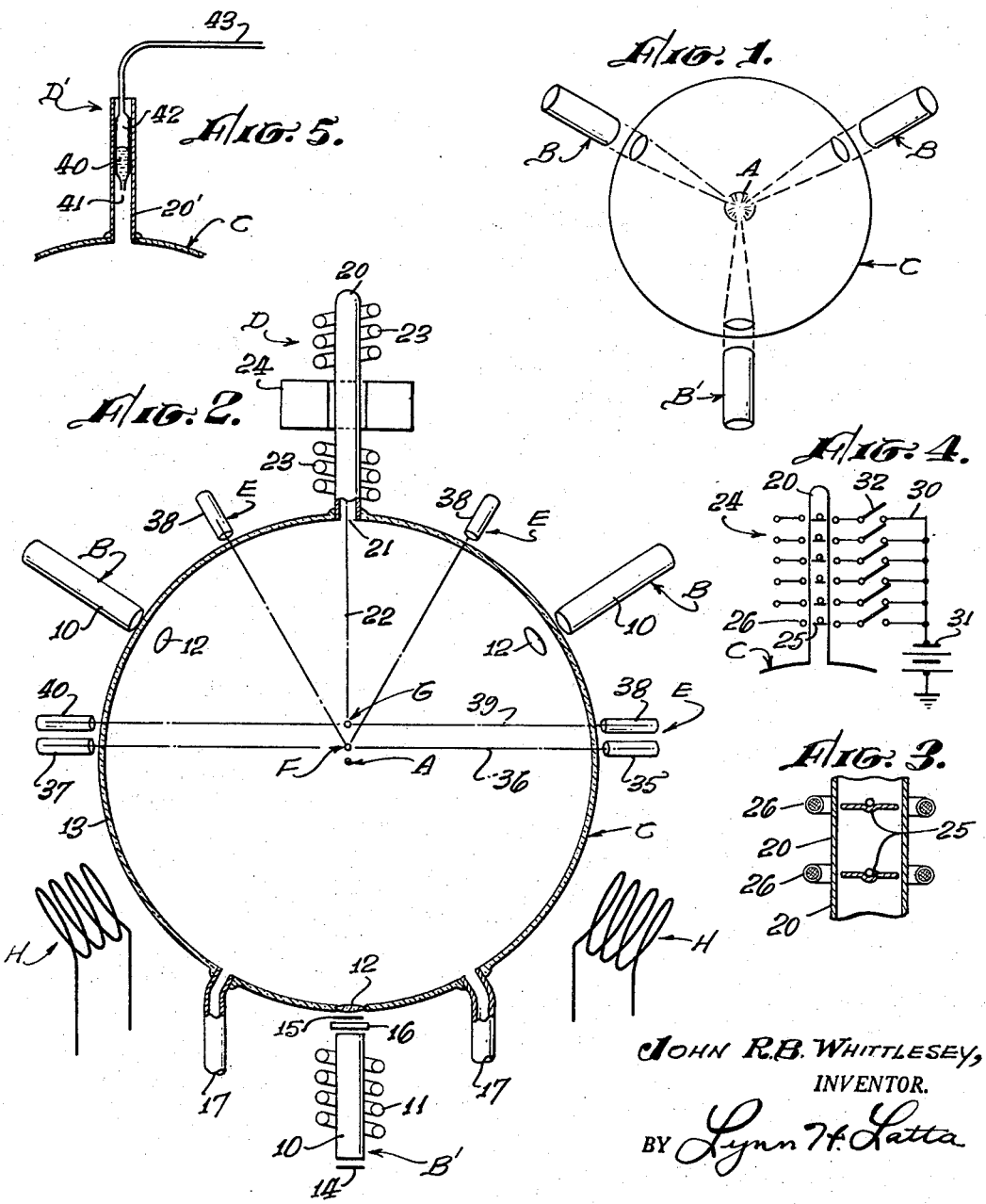
JOHN R.B. WHITTLESEY,
INVENTOR.
BY Lynn H. Latta
ATTORNEYS

United States Patent Office 3,378,446
Patented Apr. 16, 1968

3,378,446
APPARATUS USING LASERS TO TRIGGER
THERMONUCLEAR REACTIONS
John R. B. Whittlesey, 1328 23rd St.,
Santa Monica, Calif. 90404
Filed Mar. 9, 1964, Ser. No. 350,176
1 Claim. (Cl. 176—1)

This invention relates to thermonuclear reactions and to methods and means for triggering such reactions. More specifically, the invention deals with the art of compressing materials into small volume, using the pressure of radiation of synchronously-fired laser beams to effect such compression. The invention contemplates the application of such compression technique to small quantities of fusionable material in a manner such as to raise the temperature of the material to a high temperature for test purposes. For example, a particular advantage of the invention may be derived in the laboratory testing of fusionable materials in small quantity in which compression is followed by implosion, under conditions wherein the reaction is fully exposed to the inspection of the research worker. More specifically, in this respect the invention contemplates a method and apparatus whereby a test reaction can be conducted in an evacuated space which is fully visible to the observer, with no vision-impeding apparatus interposed in the path of vision.

An important object of the invention is to provide for the application of focused high pressures and the resultant raising of temperatures to high levels in a minute or very small test specimen with extreme rapidity (in a matter of microseconds). A related object is to provide an apparatus and process whereby such application of focused pressures and resultant extremely rapid temperature rise can be achieved. The containing effort of the focused pressure will tend to momentarily offset the expansion resulting from the increase in temperature.

The invention further contemplates the use of simultaneously fired laser beams to apply high compressive forces to small quantities of other materials for very rapidly heating them to ultra high temperatures in a manner to provide maximum visibility of the resultant reaction.

Toward the attainment of the above described broad objects, the invention contemplates the focusing of a plurality of laser beams in a common focal region in evacuated space, the use of synchronizing mechanism for firing the several laser beams simultaneously, together with coordinated means for placing a small particle or droplet of test material accurately in the focal region at the instant of firing the beams, so as to apply the radiation pressure of the beam against respective sides of the test particle in a manner to balance the net forces around the particle. More specifically, the invention provides an arrangement of four or more laser beams focused on the focal region along radii converging at equal angles with respect to one another, so as to balance the radiation pressure forces angularly around the particle.

A further object is to provide a method and apparatus for utilizing a small thermonuclear plasma explosion to generate electric energy by reaction against magnetic fields surrounding the focal region where the explosion is generated, and at some distance therefrom.

Experiments attempting to generate the temperatures needed for controlled thermonuclear reactions have encountered difficulty in containing the resultant super heated plasma. Attempts have been made to utilize intense magnetic fields, producing a "pinch" effect functioning as a "magnetic bottle." ("Tapping Nature's Storehouse of Violent Energy," by George A. W. Boehm in Fortune magazine August 1963, vol. LXVIII, pp. 220–227). The effect of turbulence has always destroyed such magnetic bottles before the end of the period during which the necessary temperature must be sustained for a successful thermonuclear reaction to occur.

In the practice of the present invention, the focused lasers (e.g. located around the circumference of the sphere) are utilized not only to generate the necessary high temperature, but also to compress a minute sample of test material at their focus, by virtue of their high pressures of radiation. A particular object is to apply the focused radiation pressures in such a concentrated manner as to raise the temperature of the fusionable material to the reaction or detonation point, thus releasing recoverable amounts of nuclear energy.

An essential feature of the invention is the placement of the multiple focused lasers in such relative positions that their pressures of radiation act to compress the specimen at their common focus and thus to effect extremely high compression while the test specimen is at minimum volume, and before such volume, as the result of thermal expansion, increases beyond the extent at which proper control can be maintained over the triggering action.

The invention further contemplates the use of electronic circuitry for simultaneous firing of all the laser beams.

Other objects and advantages will become apparent in the ensuing specification and appended drawing in which:

FIG. 1 is a plan view of an apparatus, illustrated schematically, representing one embodiment of the invention;

FIG. 2 is a vertical sectional view of the same shown schematically and including a diagram of the control apparatus;

FIGS. 3 and 4 are schematic detail sectional views of alternate forms of pellet release mechanism utilized by the invention;

FIG. 5 is a detail sectional view of another test specimen release mechanism, for delivering specimens in the form of liquid droplets; and FIG. 6 is a block diagram of a control circuit for cycling control of the operation of the apparatus.

Referring now to the drawings in detail, and in particular to FIGS. 1, 2, 3 and 6, I have shown therein as an example of one form in which the invention may be embodied, an apparatus for treatment of a minute test specimen. Such apparatus comprises a plurality of lasers indicated at B and B' respectively, supported (by suitable alignment and support means not shown) in focused relation to the center A of a spherical shell C which defines a chamber which can be evacuated for the purposes of the test operation to be performed on the particle. The lasers B are arranged on respective radii of the center of chamber C in equi-angular spacing from one another. For the purposes of the specific apparatus shown in FIGS. 1 and 2, one of the lasers B' can be disposed below the chamber on the vertical axis thereof, and the remaining lasers B may be three in number, disposed at a common level in an array around said vertical axis, equally spaced from one another circumferentially and equally spaced angularly from the bottom laser B'. Such an arrangement might be regarded as a tetrahedral arrangement, with the four lasers disposed at the four corners of a symmetrical tetrahedron, and coaxial with four axes radiating from the center of the tetrahedron to its respective corners. The invention contemplates a preferred arrangement wherein a minimum number of four lasers are utilized for the balanced focused arrangement of the invention, but it is to be understood that any selected number of lasers greater than one can be used so long as all of the lasers are focused at a common center in a mutually opposing or balanced arrangement. This would ordinarily imply equi-angular spacing with reference to one another around said center (i.e. an arrangement which will hereinafter be referred to as a symmetrical arrangement).

The invention thus contemplates as possible arrangements, those in which there are pairs of lasers diametrically opposed to one another on a common axis or diameter of the chamber C (e.g. when using 2 or 6 instead of 4 lasers), as well as the other balanced arrangements.

The apparatus further includes a pellet dropping means D for delivering a test pellet to the center A of the chamber C.

The apparatus also includes triggering mechanism E for initiating the cycle of operation of the laser beams, B, B' at a proper point in the descent of the pellet to the chamber center A, so related to the speed of descent and the total time of the laser cycle as to produce the simultaneous firing of all lasers at the instance the pellet reaches the center of the chamber C where the lasers are focused. The triggering mechanism E includes a plurality of photo-cells which likewise are focused on a common focal point F located on the vertical axis of the center of the chamber C and at a small distance above the chamber center A, whereby the test particle, as it drops toward the center of chamber, will interrupt the focused photo-cell beams at trigger point F so as to trigger the sequence of laser operations, whereby the firing may occur when the particle reaches the laser focal center A. While theoretically it would be possible to trigger the sequence using only a single photo-cell crossing the trigger point F, it is considered preferable to utilize several focused photocell beams, one of which may be utilized for the actual triggering and the others being utilized to provide information in the event that any malfunctioning of the apparatus should result in a deviation of the test particle from a path accurately intersecting the chamber center A, so that information as to the reason for a failure of the apparatus to produce the intended effect upon the test particle, may be made available.

The triggering apparatus E may further include additional photo-cells for monitoring the fall of the test particle along the path to the chamber center A in a manner to provide signals for correction of any deviation in the expected speed of the test particle upon arrival at the trigger center F, which deviation might be caused by variations in the height of fall (e.g. in the use of the multiple dispensing units hereinafter described). Such monitoring operation may involve the interruption of one or more photo-cell beams at a monitoring point G on the path of fall of the test particle.

The apparatus further includes magnetic field generating apparatus H for detecting plasma expansion energies. Finally, the apparatus includes electronic cycling control mechanism which is indicated generally in FIG. 6.

Describing the apparatus now in detail, each of the lasers B may be of known construction including a suitable core 10 of cylindrical rod form and of a suitable material such as ruby or glass, an excitation flash tube 11 surrounding and illuminating or otherwise energizing the core 10, and suitable housing and trigger electrode elements, together with electrical connections to the ends of the flash lamp 11 which, being conventional in lasers, are not disclosed in detail. It will be understood that the flash lamp 11 may either be of the helical wrap-around form disclosed, or some other known energizing device. Focusing lenses 12 are mounted in the wall of chamber C which may consist of a spherical shell 13 of suitable gas-impervious material. For example, the shell 13 could be of glass to provide unobstructed vision into the test chamber C, and under such conditions the lenses 12 could be located externally with respect to the shell, or internally as desired. It will be understood of course that the lenses 12 and the lasers B are arranged on common axes coinciding with radii of the chamber center A.

Each laser B also includes suitable reflectors 14 and 15 for the rearward and forward ends of each laser respectively, and a shutter device 16 interposed between one of the reflectors 15 and the adjacent end of the core 10 (these parts are disclosed in connection with the bottom laser B' and are included in the laser units B though not shown).

The chamber C is provided with a suitable evacuation duct or ducts 17 connected to shell 13 for establishing and maintaining a substantial vacuum therein.

The dispensing unit D comprises a barrel 20 in the form of a small tube rising vertically from the top of the shell 13 and having an open lower end communicating with a port 21 in the top of the shell, through which the test particle may enter the chamber C. The barrel 20 is coaxial with the vertical axis through center A, which defines the path 22 along which the test particle travels as it drops toward the center. The upper end of the barrel 20 is hermetically sealed to maintain the vacuum in the chamber C. A refrigerating coil or coils 23 encircle the barrel 20 for refrigerating the test particles as they are stored in the barrel prior to release, where such test particles might be of a material which is gaseous at room temperatures (e.g. deuterium-tritium). Where required, the refrigeration is such as to maintain the test substance in the desired state (e.g. solid or liquid).

The dispensing unit D also includes release mechanism 24 which is shown schematically in FIG. 2 and in detail in FIGS. 3, 4 and 5. Referring now to FIG. 3, such release mechanism includes a support pad or tray 25 (or a plurality of such supports as shown) of magnetic material such as iron, held in a horizontal plane by a magnetic field generated by a coil 26 surrounding the barrel 20 at a selected level where the test particle is to be supported.

Additional coils below the coil 26, may be energized in sequence to accelerate the support tray 25 away from the test pellet after release.

As shown in FIG. 3, there may be a series of the coils 26 vertically spaced and operative when energized to support a plurality of trays 25 and their respective test pellets in vertically superimposed array. The coils may be maintained in energized condition by respective circuits 30 receiving current from a source 31 and having respective switches 32 which can be opened sequentially (beginning at the bottom) to successively release the pellets in turn.

The trigegring mechanism E includes one or more photo-cells 35 positioned to receive a light beam 36 from a projector unit 37 on the opposite side of chamber C, the light beam 36 passing through the point F where the sequence of electronic operations culminating in the firing of the lasers, is triggered by such light beam interruption. In a somewhat higher plane, one or more photo-cells 38 are arranged so that each will receive a respective light beam 39 from a projector 40 in a diametrically opposed position. The light beam or beams 39 intersect the point G on the path of test particle fall where the interruption of the beam 39 effects a monitoring operation, for the purpose of detecting irregularities in the velocity of the falling particle.

Referring now to FIG. 5, instead of the pellet discharge mechanism D, the invention may utilize a liquid droplet discharge mechanism D' as shown in FIG. 5. Such mechanism may include a dropper 40 having a dispensing nozzle 41 of appropriate fineness to dispense the selected size droplet as the test particle. Dropper 40 is mounted and sealed in the barrel 20' to maintain the desired vacuum in chamber C. A body of liquid to be dispensed is maintained in the lower portion of the chamber within the dropper, and above it is an air chamber 42 which is normally of sufficiently low pressure to allow the liquid below it to be supported by its surface tension at the nozzle 41. Connected to the upper end of the dropper 40 and communicating with the air chamber 42 is a control tube 43 leading to a suitable pressure control device which may be actuated to momentarily create a slight pressure pulse in the chamber 42 sufficient to cause the desired droplet to be ejected from the body of liquid in the dropper 42. Such pressure pulse mechanism may be of any conventional type and is located at a sufficient distance from the dropper 40 so that it will not be affected by the low temperature maintained around the barrel 20' by the refrigerating coils 23, when a substance with a very low boiling point is to be dispensed.

Referring now to FIG. 6, sequential control of the lasers B and B' is effected as an automatic response to the fall of the test particle (pellet or droplet) by utilizing a pulse (indicated at 45) in a triggering circuit embodying standard short duration-pulse circuitry, in which the pulse 45 is developed in response to the interruption of light beam 36 by the falling test particle. The pulse 45 is fed into a delayed-response circuit indicated in block diagram at 47, said circuit including means for adjusting the time delay factor. In response to the pulse 45, the delay circuit 47, after the interval of delay to which it has been adjusted, will send out a series of signals indicated at 48, to the respective energizing flash tubes 11 of lasers B, to initiate the build up of energy. The delay period in circuit 47 is related to the distance from the trigger point F to the chamber center A and to the velocity of the test particle when it reaches trigger point F, so as to attain the proper laser firing schedule.

At the same time it sends the multiple signals to the laser excitation coils, circuit 47 also sends a signal, indicated at 50, to a firing control circuit 51. Circuit 51 is such as to provide a very short delay interval (e.g. .5 millisecond) between reception of signal 50 and the sending of a series of simultaneous signals 52 to the laser shutter-opening circuits 53, to release the accumulated energies of the lasers in the form of respective giant pulses which are discharged from the respective lasers in the form of laser beams. Preferably, the shutters 16 are of the type utilizing a nitrobenzine Kerr cell in conjunction with a Glan-Thomson prism, adapted to produce giant pulses of the order of 10 or more megawatts of power from each laser by the Hellwarth-McClung or related method ("Lasers" by Bela A. Lengyel of Hughes Research Laboratories, Malibu, Calif., published by John Wiley & Sons, Inc. in 1962, p. 62). The .5 millisecond delay in the response of circuit 51 is utilized to allow the lasers to reach full excitation. The shutters are adapted to open in a fraction of a microsecond, and the timing of the control circuitry is such as to effect such opening at the instant the test particle reaches the focal point A.

At the same time it distributes the firing signals 52 to the lasers, the circuit 51 also sends a signal, indicated at 54, to a ten microsecond delay circuit 55 which, at the end of its delay period, sends a plurality of signals 56 to the respective shutter-closing circuits 57.

At the same time, circuit 55 sends a signal 58 to a delay circuit 59 embodying a series of adjustable-delay sub-circuits which are operative in response to signal 58 to send a series of signals 60 of varying delay to a plurality of observation instruments including cameras, etc. Such instruments may vary depending upon the nature of the test observation being made.

It has been estimated that pressures of up to 15 million pounds per square inch can be derived from focused laser beams (Arthur L. Schawlow in the article "Advances In Optical Masers" published in Scientific American—July 1963).

In the present invention, these high pressures are concentrated upon the test specimen at a reaction point (chamber center A) in geometrically balanced, focused relation such that the net effect is to compress the specimen toward its center. Such compression can be utilized for exciting a tiny particle of fusionable material, or may be utilized to raise the temperature of a specimen instantaneously to an extremely high degree while in effect momentarily enclosing and confining the resultant plasma material at the focal point.

The invention differs from earlier patents involving multiple focused heat sources, in that for non-coherent radiation sources (which all of these were) a law of classical optics states that the radiant flux density at the image can be no greater than the radiant flux density at the source. This would means that temperatures and pressures could not be generated at the image point by such methods which were greater than that temperatures and radiation pressures at the surfaces of the illuminating (non-coherent) sources. (Ref. Lasers, p. 6, and ref. M. Born and E. Wolf, Principles of Optics, Pergamon Press, 1959, p. 188.) Non-coherent sources include electric arcs (as in U.S. Patent Nos. 3,001,055 and 2,927,187), plasmas (as in U.S. Patent No. 3,015,013), the sun, etc. This is true no matter what the method of focusing. It also differs from the earlier patents by including a method for significantly compressing the specimen being heated.

I claim:

1. Apparatus for substantially instantaneous heating of a test particle comprising: means defining an hermetically sealed test chamber; means for evacuating said chamber; a plurality of lasers focused in balanced arrangement upon a reaction point within said chamber; a fall-directing barrel communicating with the top of said chamber; a test pellet supporting seat of magnetic material; means adjacent said barrel for creating a magnetic field for holding said pellet supporting seat within said barrel and then releasing it for free fall of said pellet along a path intersecting said reaction point; and means responsive to the passage of said particle through a trigger point above said reaction point in the path of free fall, for energizing said lasers and then firing them simultaneously so as to apply their beams to said particle symmetrically, whereby to apply balanced pressures to said particle to effect said substantially instantaneous heating.

References Cited

UNITED STATES PATENTS

| 3,041,936 | 7/1962 | Hull | 88—61 |
| 3,094,474 | 6/1963 | Gale | 176—1 X |
| 3,199,049 | 8/1965 | Morse et al. | 331—94.5 |

FOREIGN PATENTS 1,240,668   8/1960   France.

OTHER REFERENCES

Masers and Lasers, A New Market With Enormous Growth Potential, E. B. Rechsteiner and R. L. Saxe, published by Technology Markets, 509 5th Ave., New York 17, N.Y., p. 57.

IBM Technical Disclosure Bulletin, vol. 5, No. 10, March 1963, p. 135.

REUBEN EPSTEIN, *Primary Examiner.*